N. JACKSON.
PNEUMATIC TIRE.
APPLICATION FILED OCT. 9, 1920.
1,384,134.
Patented July 12, 1921.
3 SHEETS—SHEET 1.
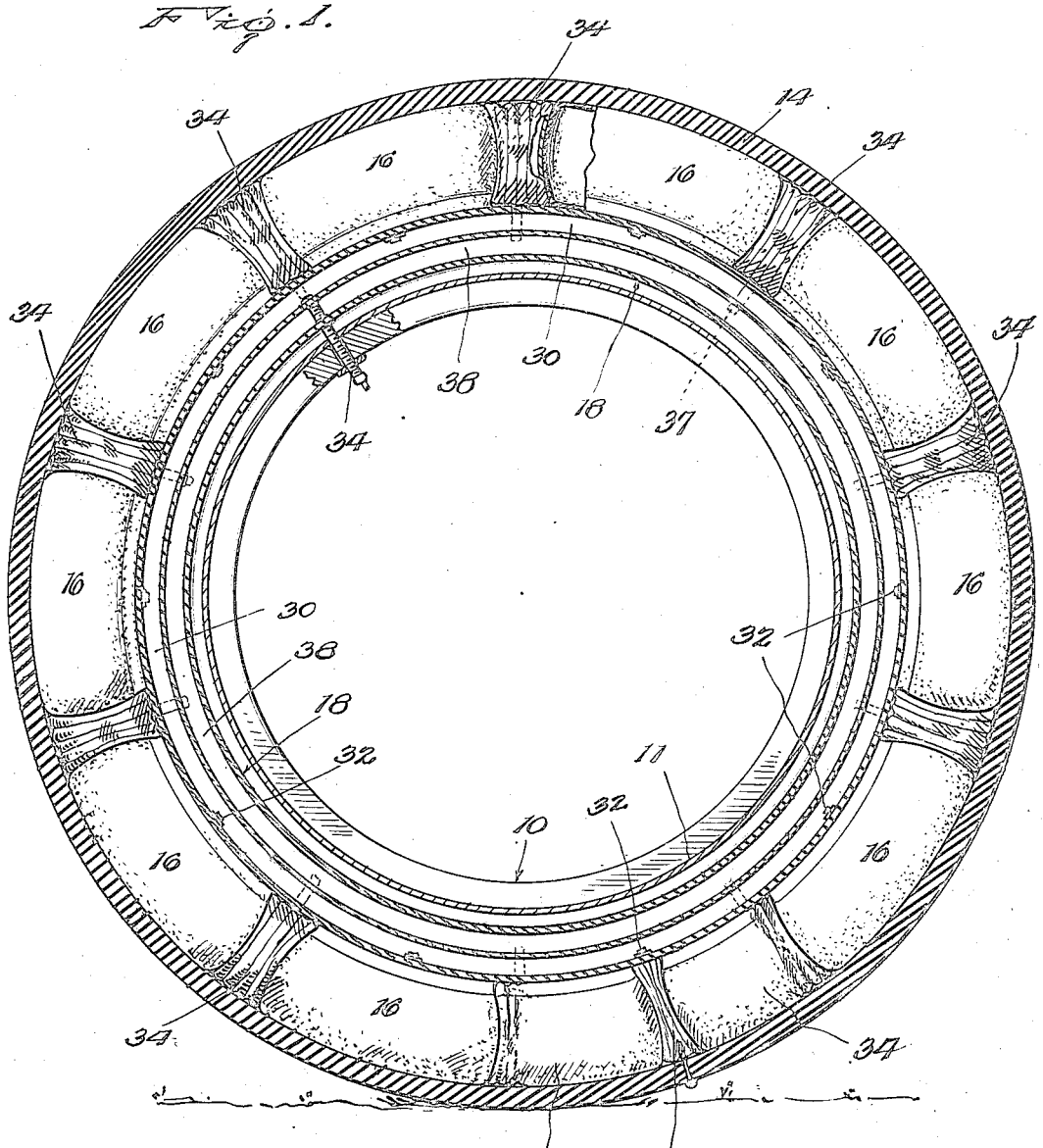
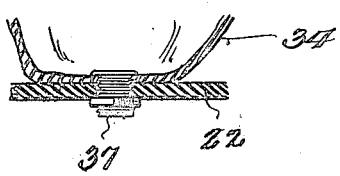
Inventor
Norman Jackson.
By Lacey & Lacey, Attorneys

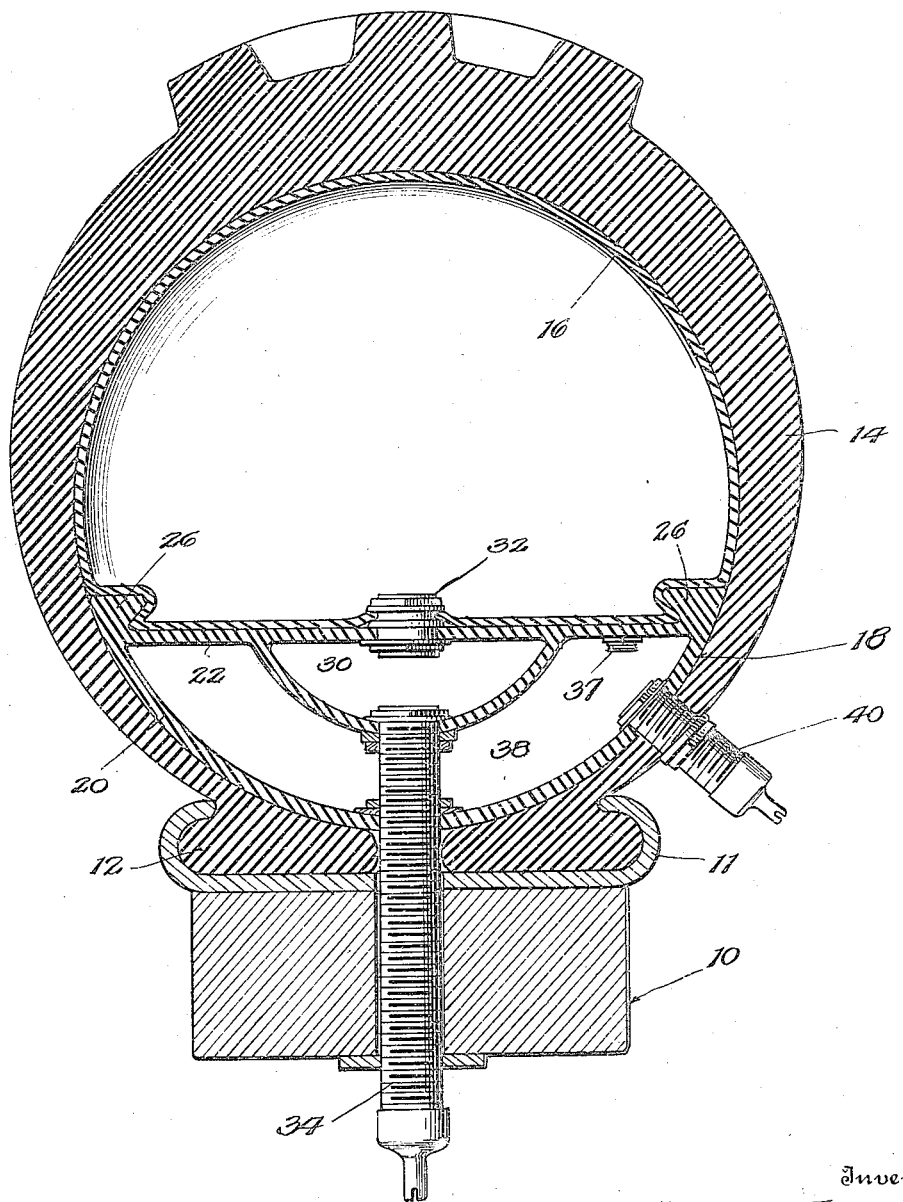

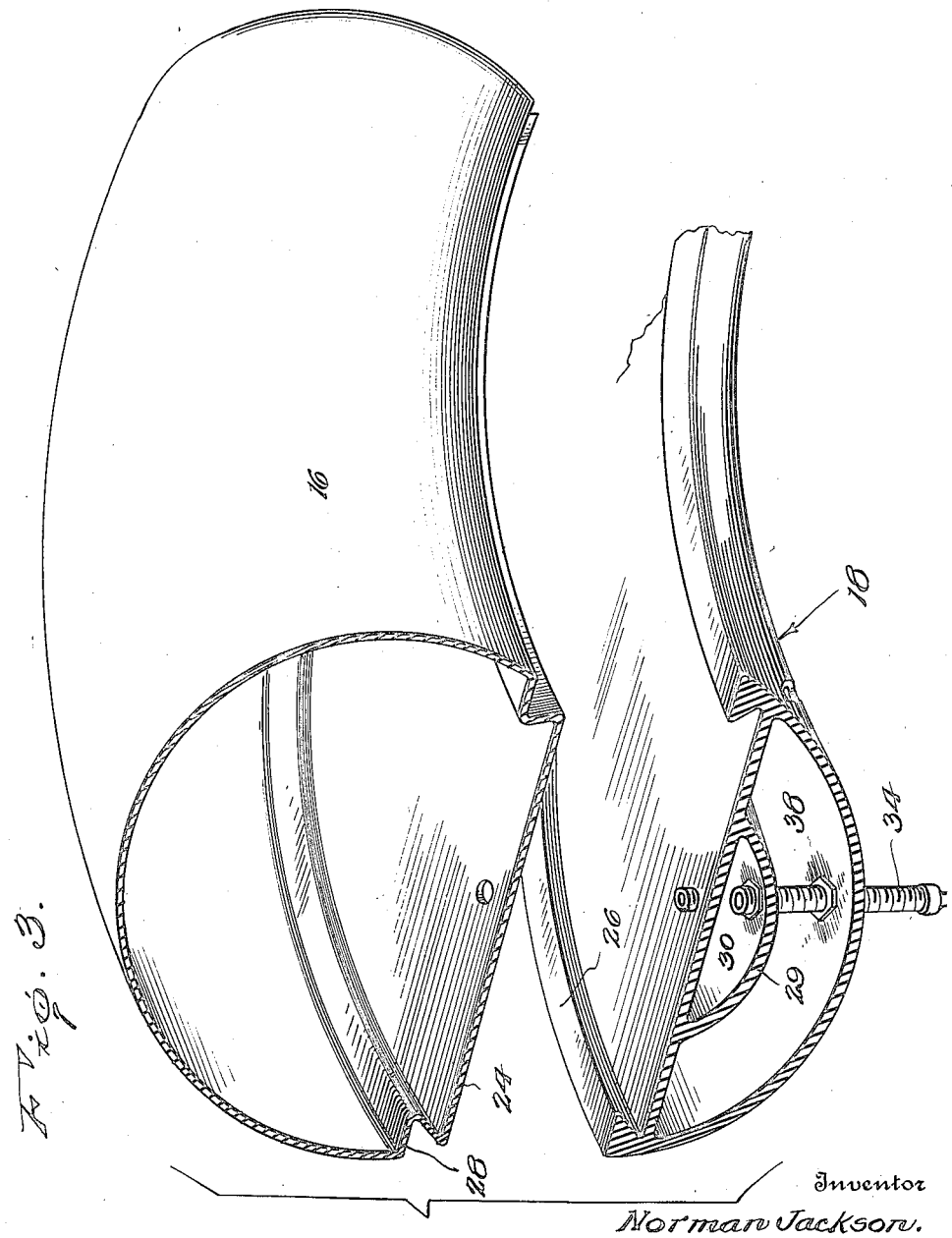

UNITED STATES PATENT OFFICE.

NORMAN JACKSON, OF WASHINGTON, DISTRICT OF COLUMBIA.

PNEUMATIC TIRE.

1,384,134.  Specification of Letters Patent.  Patented July 12, 1921.

Application filed October 9, 1920. Serial No. 415,794.

*To all whom it may concern:*

Be it known that I, NORMAN JACKSON, a citizen of the United States, residing at Washington, District of Columbia, have invented certain new and useful Improvements in Pneumatic Tires, of which the following is a specification.

This invention relates to improvements in pneumatic tires and more particularly to the inner tube construction thereof.

An important object of this invention is to provide a tire embodying an annular series of arcuate air tubes between which are arranged an annular series of emergency tubes adapted to displace the main air tubes should the latter become punctured.

A further object of the invention is to provide a tire having simple means whereby the main tubes may be inflated simultaneously and independently of the auxiliary or emergency sections.

A further object of the invention is to provide a tube of the class described having simple means whereby the emergency sections are caused to displace the main sections of the tube when the latter are punctured and also to provide means whereby the emergency sections are automatically inflated when brought into operation.

A further object of the invention is to provide a tire of the class described which is of highly simplified construction, durable in use, and cheap to manufacture.

Other objects and advantages of the invention will be apparent during the course of the following description.

In the accompanying drawings forming a part of this application and in which like numerals are employed to designate like parts throughout the same:

Figure 1 is a sectional view through a tire casing equipped with the improved sectional tube, Fig. 2 is a transverse sectional view through the improved tube in use, Fig. 3 is a fragmentary sectional perspective of the improved tube, Fig. 4 is a detail sectional view through the improved tube.

In the drawings wherein for the purpose of illustration is shown a preferred embodiment of the invention, the numeral 10 designates the felly of a wheel about which is arranged a metallic rim 11. The edge portions of the rim 11 are formed with flanges which engage the beads 12 of a tire casing 14 whereby the tire casing will be securely though detachably held in position.

The invention forming the subject matter of this application embodies an annular series of arcuate sections 16 arranged within the casing and inflated to a high degree so as to sustain the vehicle to which the tire is applied. In this case, the main sections 16 are ten in number though it is obvious that the number of main sections may be increased or decreased to conform to the diameter of the tire.

The main sustaining sections 16 are mounted upon the outer side of an annular tube 18 which, as illustrated in Fig. 2, is arranged within the casing 14 and has its inner side 20 curved transversely so as to conform to the curvature of the adjacent portion of the casing. The outer side 22 of the tube 18 is flat and is flatly engaged by the flat inner wall 24 of each main section 16. The outer side edges of the tube 18 are formed with continuous inwardly extending flanges 26 which are received in grooves 28 formed in the adjacent portions of the main sections 16. In this manner, the main sections 16 are held against movement when inflated.

As illustrated in Fig. 3, a transversely curved wall 29 has its edge portions secured to the inner side of the wall 22 so as to form a main supply chamber 30 which has communication with the main sections 16 through the medium of one-way valves 32. The valves 32, of course, serve to admit air into the main sections 16 from the main supply chamber 30. The main supply chamber 30 has a valve 34 connected thereto and extending through the felly 10 so that an air hose may be connected to the valve 34 so as to supply a quantity of highly compressed air to the annular chamber 30. The main air supply chamber 30 supplies all of the main sections 16 simultaneously and uniformly whereby the air pressure within each main section 16 is equal to the air pressure in the other main sections 16.

As illustrated in Fig. 1, emergency sections 34 are arranged within the casing between the ends of the main sections 16 and normally occupy a folded or compressed position. The emergency sections 34 are adapted to displace the main sections 16 should any of the latter be punctured. The emergency sections 34 are immediately and automatically inflated so as to take the place of any one or more of the main sections which may be rendered inoperative by reason of a puncture or the like.

The means employed for automatically inflating two or more of the emergency sections should one or more of the main sections be punctured, comprises a plurality of valves 37 which establish communication between the emergency sections and an emergency chamber 38 formed in the tube 18. The emergency chamber 38 which is of a much greater capacity than the main chamber 30, has connection with a valve 40 which is capable of attachment to the air hose of a pump.

In assembling the improved tire, the main and emergency sections are arranged within the casing 14 and by inflating the main supply chamber 30 the main tubes 16 will become inflated so as to compress or fold the emergency sections 34. The emergency chamber 38 may now have air pumped into it to the proper pressure so that the emergency sections will be automatically and instantly inflated should one or more of the main sections become deflated.

By reason of the construction set forth, the puncturing of the tire would not necessitate immediate repair since the emergency sections will automatically displace the main sections. It would be necessary to puncture almost all the main sections 16 to have any great effect on the tire.

Having thus described the invention, what is claimed as new is:

1. A tire comprising main sections, emergency sections arranged in juxtaposition to the main sections, and a supply tube having a chamber communicating with said main sections and a chamber communicating with said emergency sections.

2. A tire comprising main sections, emergency sections arranged between the main sections, a supply tube having a chamber communicating with said main sections and a chamber communicating with said emergency sections, and means whereby air may be introduced into said first and second named chambers.

3. A tire comprising main sections, emergency sections arranged between the main sections, a supply tube having a chamber communicating with said main sections and a chamber communicating with said emergency sections, and flanges formed along the sides of said tube and engaging said sections.

4. A tire comprising main sections, emergency sections arranged between the main sections, a supply tube having a chamber communicating with said main sections and a chamber communicating with said emergency sections, the opposed sides of said tube and said sections being flat, and flanges formed along the sides of said tube and engaging said sections.

5. A tire comprising main sections arranged in annular formation, emergency sections arranged between the ends of said main sections, a supply tube having a partition forming main and emergency chambers, and valves establishing communication between said chambers and said sections.

6. A tire comprising main sections arranged in annular formation, emergency sections arranged between the ends of said main sections, a supply tube having a partition forming main and emergency chambers, valves establishing communication between said chamber and said sections, and supply valves for said chambers.

7. A tire comprising main sections arranged in annular formation, emergency sections arranged between the ends of said main sections, a supply tube having a partition forming main and emergency chambers, and valves establishing communication between said chambers and said sections, said emergency chamber being of a greater capacity than said main chamber.

8. A tire comprising main sections, emergency sections arranged between the ends of said main sections and being normally compressed, a supply tube having a flat outer wall engaged by the inner sides of said sections, and a transversely curved centrally arranged partition upon said flat outer wall and forming main and emergency chambers, said main and emergency chambers being in communication with said sections.

9. A tire comprising main sections, emergency sections arranged between the ends of said main sections and being normally compressed, a supply tube having a flat outer wall engaged by the inner sides of said sections, a transversely curved centrally arranged partition upon said flat outer wall and forming main and emergency chambers, said main and emergency chambers being in communication with said sections, and valves connected to said chambers.

In testimony whereof I affix my signature.

NORMAN JACKSON. [L. S.]